United States Patent [19]

Hagiwara et al.

[11] Patent Number: 5,995,935

[45] Date of Patent: Nov. 30, 1999

[54] LANGUAGE INFORMATION PROCESSING APPARATUS WITH SPEECH OUTPUT OF A SENTENCE EXAMPLE IN ACCORDANCE WITH THE SEX OF PERSONS WHO USE IT

[75] Inventors: Nobuki Hagiwara; Kunihiro Seno; Hiromi Furusawa; Kentaro Tsuchiya, all of Ebina, Japan

[73] Assignee: Fuji Xerox Co., Ltd., Tokyo, Japan

[21] Appl. No.: 08/804,119

[22] Filed: Feb. 20, 1997

[30] Foreign Application Priority Data

Feb. 26, 1996 [JP] Japan ................................. 8-038296

[51] Int. Cl.⁶ ..................................................... G10L 9/06
[52] U.S. Cl. .......................... 704/272; 704/270; 704/276; 704/277
[58] Field of Search ..................................... 704/246, 257, 704/261, 275, 270, 272, 276, 277, 231, 251

[56] References Cited

U.S. PATENT DOCUMENTS

| | | | |
|---|---|---|---|
| 4,623,970 | 11/1986 | Toyomura ................................. | 704/261 |
| 4,624,012 | 11/1986 | Lin et al. ................................. | 704/261 |
| 4,823,380 | 4/1989 | Kohen et al. ............................ | 379/387 |
| 5,113,449 | 5/1992 | Blanton et al. .......................... | 704/261 |
| 5,333,275 | 7/1994 | Wheatley et al. ....................... | 704/243 |
| 5,487,671 | 1/1996 | Shpiro et al. ............................ | 434/185 |
| 5,572,624 | 11/1996 | Sejnoha ................................... | 704/256 |
| 5,632,002 | 5/1997 | Hashimoto et al. ..................... | 704/231 |
| 5,636,325 | 6/1997 | Farrett ..................................... | 704/258 |
| 5,699,486 | 12/1997 | Tullis et al. .............................. | 704/270 |
| 5,715,369 | 2/1998 | Spoltman et al. ....................... | 704/270 |

FOREIGN PATENT DOCUMENTS 5-324702  12/1993  Japan .

OTHER PUBLICATIONS

Ke Wu & D.G. Childers, Gender recognition from speech, vol. 90, Journal of the Acoustical Society of America, pp. 1828–1856, Oct. 1991.

*Primary Examiner*—David R. Hudspeth
*Assistant Examiner*—Abul K. Azad
*Attorney, Agent, or Firm*—Oliff & Berridge, PLC

[57] ABSTRACT

When a voice button is pressed after selection of a desired sentence example, a CPU causes a musical note mark to be displayed on a display. If the selected sentence example is one for the opposite sex, the CPU reads out speech data (in a voice of a person of the opposite sex) corresponding to the selected sentence example from a ROM, and causes the readout speech data to be outputted in voice form from a speaker. The selected sentence example is displayed in parenthesis, to show the user that the displayed sentence is for the opposite sex. If the selected sentence example is not one for the opposite sex, the CPU reads out speech data (in a voice of a person of the same sex) corresponding to the selected sentence example from the ROM, and causes the readout speech data to be outputted in voice form from the speaker. Alternatively, speech data corresponding to sentence examples for the opposite sex are not stored in the ROM, and therefore are not outputted in voice form.

15 Claims, 6 Drawing Sheets

FIG. 3

| JAPANESE SENTENCE EXAMPLE DATA | ENGLISH SENTENCE EXAMPLE DATA |
|---|---|
| HAJIMEMASHITE | HOW DO YOU DO? |
| KONNICHIWA | HELLO |
| (KONO ESUTE NO TAIKEN KOSU WA ARIMASUKA) | (DO YOU OFFER A TRIAL SESSION FOR THIS BEAUTY TREATMENT?) |
| (MANIKYUA WO ONEGAISHIMASU) | (I'D LIKE A MANICURE) |
| EIGO NO WAKARU HITO WA IMASUKA | IS THERE SOMEONE WHO UNDERSTANDS ENGLISH? |
| (WATASHI WA NINSHIN SHITEIMASU) | (I'M PREGNANT) | ions
LANGUAGE INFORMATION PROCESSING APPARATUS WITH SPEECH OUTPUT OF A SENTENCE EXAMPLE IN ACCORDANCE WITH THE SEX OF PERSONS WHO USE IT

BACKGROUND OF THE INVENTION

1. Field of the Invention

The present invention relates to a language information processing apparatus which is suitably used as an electronic translating machine such as a portable translating apparatus.

2. Description of the Related Art

Conventionally, as language information processing apparatuses, electronic translating machines such as portable translating apparatuses which translate a sentence example selected by a user from among definite-form sentences prepared in advance (e.g., in Japanese) into another predetermined language (e.g., English), and which display the translated sentence on a display unit in that language or speak the translated sentence are known. In general, there are phrases (sentence examples) which are used only by males, as well as phrases (sentence examples) -which are used only by females. That is, male users do not require the sentence examples used only by females, and female users do not require the sentence examples used only by males.

Accordingly, in the conventional language information processing apparatuses, in a case where the user is female, all the speech data corresponding to sentence examples are stored in a female voice, and every speech is generated in a female voice. On the other hand, in a case where the user is male, all the speech data corresponding to sentence examples are stored in a male voice, and every speech is generated in a male voice. In other words, the user uses an apparatus in which the speech data corresponding to his or her sex are stored.

In recent years, among the above-described language information processing apparatuses, an apparatus has been proposed which permits communication with another apparatus at a remote place by exchanging sentence example information. In this case, the transmitting side transmits only a code designating a sentence example that one intends to send to the other party, while the receiving side reads speech data corresponding to the received sentence example (code) and displays it or outputs it as a voice.

However, in the conventional language information processing apparatus, if the user is male (female), even sentence examples used exclusively by females (males) are stored in a male (female) voice. Therefore, in a communication between persons of opposite sexes, in a case where the transmitting side is female (male) and a sentence example used exclusively by females (males) is transmitted, the transmitted sentence example is spoken in a male (female) voice if the receiving side is male (female), though it is one peculiar to females (males). This may cause the following problems: a sense of incompatibility is imparted to the other party or the user himself or herself, and the sex of the other party or the user is misunderstood.

SUMMARY OF THE INVENTION

The present invention has been devised in view of the above-described circumstances, and its object is to provide a language information processing apparatus which eliminates a sense of incompatibility in exchanging information, thereby allowing accurate transmission of the information.

To attain the above object, according to a first aspect of the invention, there is provided a language information processing apparatus comprising sentence example storing means for storing a plurality of sentence examples; speech storing means for storing, in a male or female voice, speech data corresponding to the sentence examples stored in the sentence example storing means; display means for displaying one of the sentence examples stored in the sentence example storing means; and speech outputting means for reading out speech data corresponding to the displayed sentence example from the speech storing means and for outputting the readout speech data in voice form, if the displayed sentence example is not a sentence example for a sex opposite to that of a user.

In the above apparatus, since the sentence examples for the opposite sex are not outputted in voice form, the sense of incompatibility can be avoided in information exchange and the information of the sex of the other party can be transferred correctly.

According to a second aspect of the invention, there is provided a language information processing apparatus comprising sentence example storing means for storing a plurality of sentence examples; speech storing means for storing, at least in a voice of a person of the opposite sex, speech data corresponding to sentence examples for a sex opposite to that of a user among the sentence examples stored in the sentence example storing means; display means for displaying one of the sentence examples stored in the sentence example storing means; and speech outputting means for reading out speech data corresponding to the displayed sentence example from the speech storing means, and for outputting the readout speech data in voice form.

In the above apparatus, since the sentence examples for the opposite sex are outputted in a voice of a person of the opposite sex, the sense of incompatibility can be avoided in information exchange and transfer of erroneous information on the sex of the other party can be prevented.

According to a third aspect of the invention, there is provided a language information processing apparatus comprising sentence example storing means for storing a plurality of sentence examples; speech storing means for storing speech data corresponding to each of the sentence examples stored in the sentence example storing means in a male or female voice depending on a sex of persons who use the sentence example; display means for displaying one of the sentence examples stored in the sentence example storing means; and speech outputting means for reading out speech data corresponding to the displayed sentence example from the speech storing means, and for outputting the readout speech data in voice form.

In the above apparatus, the sentence examples peculiar to males are outputted in a male voice while the sentence examples peculiar to females are outputted in a female voice. Therefore, the sense of incompatibility can be avoided in information exchange, and the information on the sex of the other party can be transferred correctly.

According to a fourth aspect of the invention, there is provided a language information processing apparatus for exchanging information with a party at a remote place via a wired or wireless communication line, comprising sentence example storing means for storing a plurality of sentence examples; speech storing means for storing, in a male or female voice, speech data corresponding to the sentence examples stored in the sentence example storing means; sex recognizing means for recognizing a sex of the party at the remote place; input means for receiving a code signal corresponding to a sentence example from the party at the remote place; display means for displaying the sentence example corresponding to the received code signal; and speech outputting means for selecting speech data corresponding to the displayed sentence example in a voice of a person of a particular sex based on the recognized sex of the party at the remote place, and for outputting the selected speech data in voice form.

In the above apparatus, it is possible to recognize whether the other party is male or female. If the other party is male, a sentence example is outputted in a male voice. If the other party is female, a sentence example is outputted in a female voice. Therefore, the sense of incompatibility can be avoided in information exchange, and the information on the sex of the other party can be transferred correctly.

BRIEF DESCRIPTION OF THE DRAWINGS

FIG. 3 is a conceptual diagram illustrating a data configuration of sentence example data;

DESCRIPTION OF THE PREFERRED EMBODIMENTS

Referring now to the accompanying drawings, a description will be given of an embodiment of the present invention.

A. Configuration of the Embodiment

Figure 1:
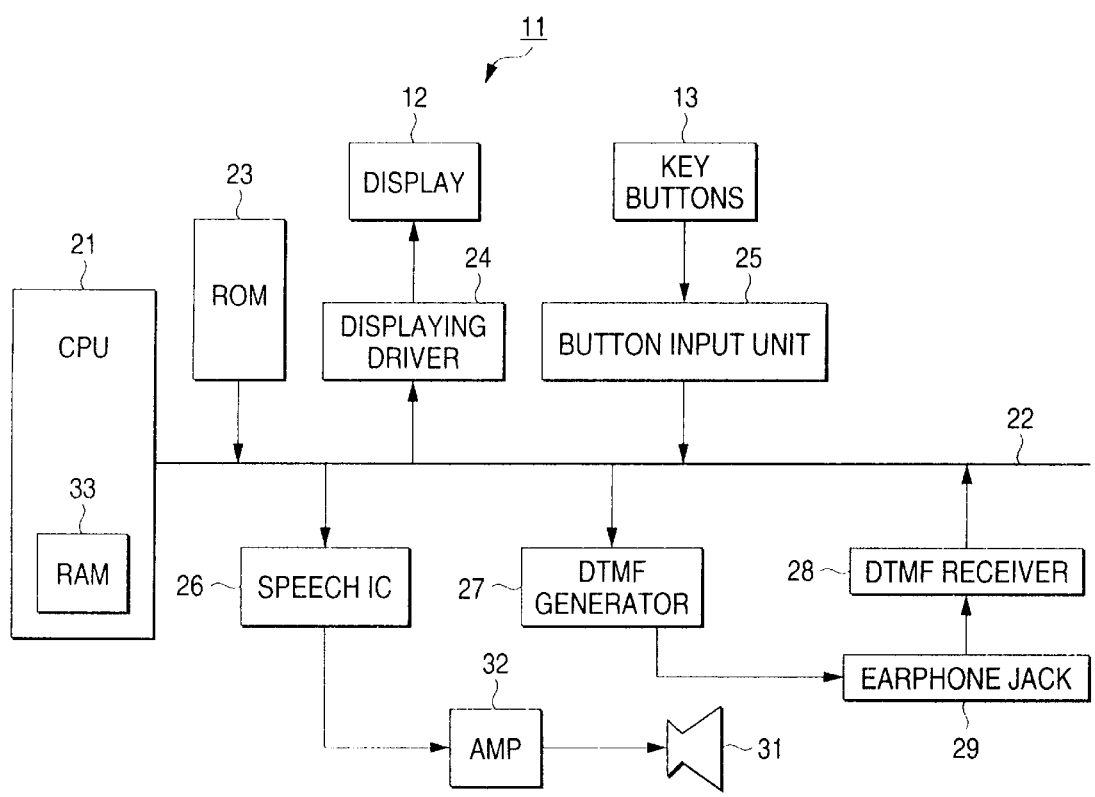
FIG. 1 is a block diagram illustrating the configuration of a language information processing apparatus according to an embodiment of the present invention.

FIG. 1 is a block diagram illustrating the configuration of a language information processing apparatus according to the embodiment of the invention. In the drawing, this language information processing apparatus 11 is an apparatus which has been developed to enable a communication between different languages, and is arranged such that sentence examples (phrases) in Japanese, English, Chinese, and so on are stored in sets, and that a designated sentence example can be displayed, in a designated language, on a liquid crystal display 12 mounted on the main body. In addition, a voice output in the designated language can be produced from a speaker 31, when necessary.

The language information processing apparatus 11 has a central processing unit (CPU) 21 for performing central functions of various items of control. The CPU 21 has a random-access memory (RAM) 33 for storing a phrase number for designating a specific sentence example from among various sentence examples stored in a read-only memory (ROM) 23 which will be described later, and for allowing various types of calculations. In addition, the CPU 21 is connected to the ROM 23, a displaying driver 24, a button input device 25, a speech IC 26, a dual tone multifrequency (DTMF) generator 27, and a dual tone multifrequency (DTMF) receiver 28 via a system bus 22.

Figure 2:
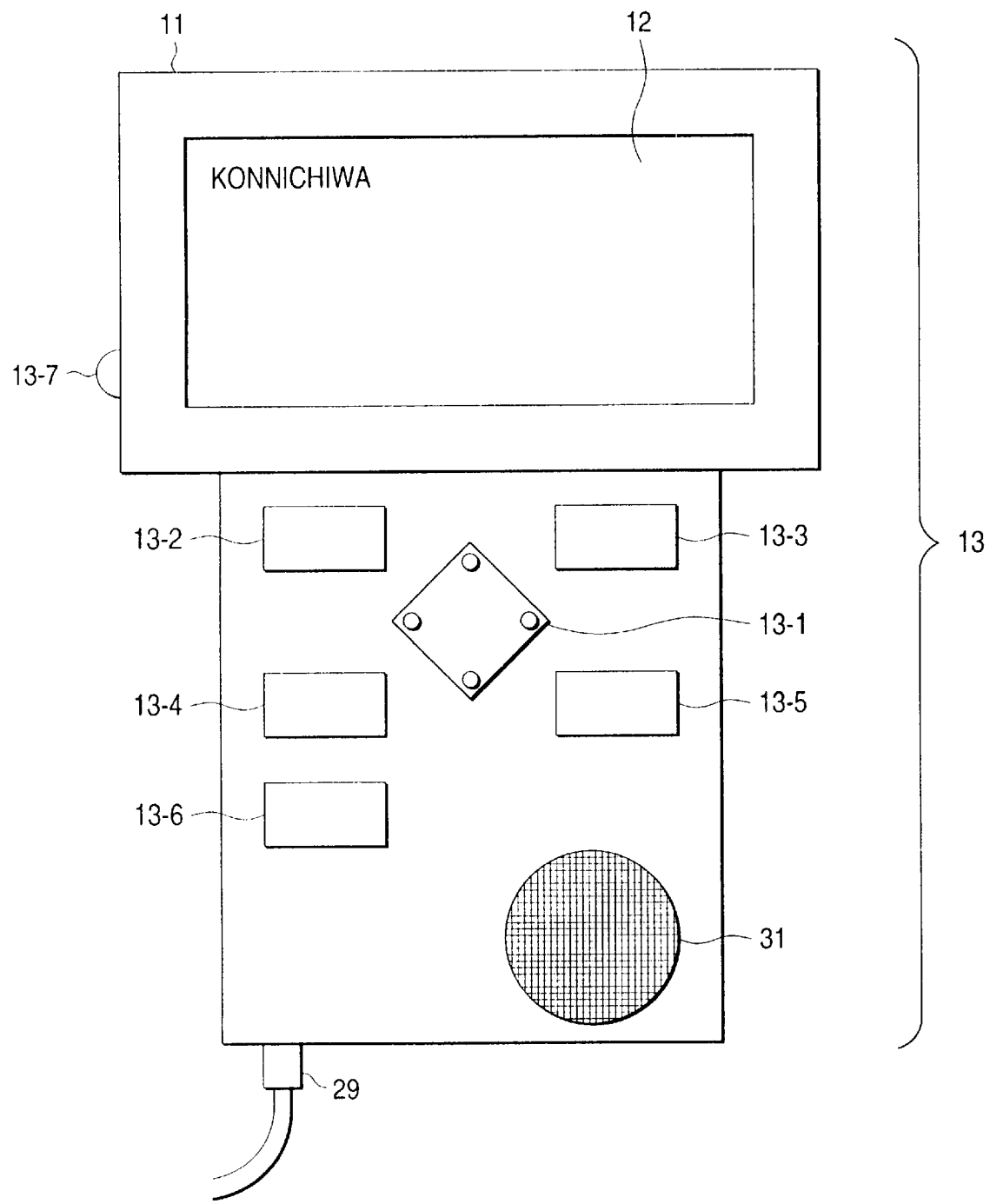
FIG. 2 is a schematic diagram illustrating an operation panel surface of the language information processing apparatus of FIG. 1.

Here, the ROM 23 is a read-only memory for storing programs for effecting various types of control of the language information providing apparatus 11, various sentence examples, speech data for voice output, and so on. The displaying driver 24 is a driver circuit for displaying a sentence example in Japanese, English, Chinese, or the like and other predetermined data on the liquid crystal display 12. The button input device 25 is a circuit for fetching input data from key buttons 13 including, as shown in FIG. 2, various switches such as up/down left/right cursor buttons 13-1, a set button 13-2, language change button 13-3, a voice button 13-4, a previous page button 13-5, a transmit button 13-6, and a power switch 13-7.

The speech IC 26 is an integrated circuit for outputting an audio signal on the basis of speech data stored for each sentence example in a part of the ROM 23. The audio signal from the speech IC 26 is amplified by an amplifier 32, and then outputted from the speaker 31.

In addition, where the user intends to communicate, through voice, with a party who is located at a remote place, he can easily perform a smooth communication by causing the voice itself that is outputted from the speaker 31 to be input to the receiver of a telephone. The DTMF generator 27 is a circuit which converts, into pushtones, a code that is generated by a calculation with the use of the RAM 33 from an address number corresponding to a sentence example in the ROM 23. The pushtones from the DTMF generator 27 are input to the earphone jack of an unillustrated telephone via an earphone jack 29, and then transmitted to a receiver by making use of the calling function of the telephone.

The DTMF receiver 28 is a circuit which receives pushtones from the earphone jack 29 via an unillustrated telephone, converts those into a code, and outputs the code to the system bus 22. The outputted code is converted into a phrase example number corresponding to a sentence example in the ROM 23 through a calculation with the use of the RAM 33 in the CPU 21.

B. Operation Panel Surface

FIG. 2 is a schematic diagram illustrating an operation panel surface of the language information processing apparatus according to the embodiment of the present invention. It should be noted that the portions corresponding to those shown in FIG. 1 are denoted by the same reference numerals, and a description thereof will be omitted. The key buttons 13 consisting of various switches and buttons are disposed on the main body. The up/down left/right cursor buttons 13-1, the set button 13-2, the language change button 13-3, the voice button 13-4, the previous page button 13-5, the transmit button 13-6, and the power switch 13-7 are disposed as the key buttons 13. The up/down left/right cursor buttons 13-1 are buttons for scrolling a screen or cursor displayed on the display 12 vertically or horizontally. The set button 13-2 is a button for confirming a desired category (topic pictogram) to select a sentence example. The language change button 13-3 is a button for designating translation of the sentence example being displayed into a target language. The voice button 13-4 is a button for instructing the apparatus to output speech of the sentence example being displayed from the speaker 31. The previous page button 13-5 is a button for causing return to a screen for selecting a category from a screen for selecting a sentence example. The transmit button 13-6 is a button for transmitting a sentence example to another language information processing apparatus at a remote place. The power switch 13-7 is a switch for turning on or off the power. A description will be given later of detailed functions of these buttons.

C. Data Structure

C-1. Sentence Example Data

The sentence example (phrase) data are stored in the ROM 23 in a state that they are classified by categories (expressed by topic pictograms) of situations where they are used, such as city, transportation, and restaurant, etc. FIG. 3 shows a data configuration of Japanese sentence example data and English sentence example data in one category. A plural sets of sentence example data are stored in one category. In the case of a Japanese-English translating machine, for example, a plurality of Japanese sentence example data and a plurality of English sentence example data which are translations of the respective Japanese sentence examples are stored such that they correspond to each other.

Each Japanese sentence example data that is used only by persons of the opposite sex is marked with a predetermined symbol to differentiate it. The same thing applies to The English sentence example data. In this embodiment, data corresponding to a parenthesis is provided at the beginning and the end of sentence example data. Since the language information processing apparatus in the illustrated example is for use by a male user, sentence example data marked with parentheses show that they are sentence examples (phrases) peculiar to females.

C-2. Speech Data

Although not illustrated, speech data in a voice of a proper sex is stored in the ROM 23 for each sentence example so that it can be output in voice form. In the following, two modes of operation will be described. In the first mode, irrespective of whether the language information processing apparatus is for use by a male or a female, speech data in a male voice are stored for sentence examples peculiar to males and speech data in a female voice is stored for sentence examples peculiar to females. In the case of sentence examples common to both males and females, speech data are stored in a male voice if the user is male and are stored in a female voice if the user is female. Thus, speech data are stored in the above manner for all the sentence examples.

In the second mode, in order to reduce the storage capacity of the memory, the language information processing apparatus for use by a male does not store speech data for sentence examples peculiar to female. Similarly, the language information processing apparatus for use by a female does not store speech data for sentence examples peculiar to males. That is, sentence examples for use by a person of the opposite sex are displayed but not outputted in voice form.

D. Operation of the Embodiment

Figure 4:
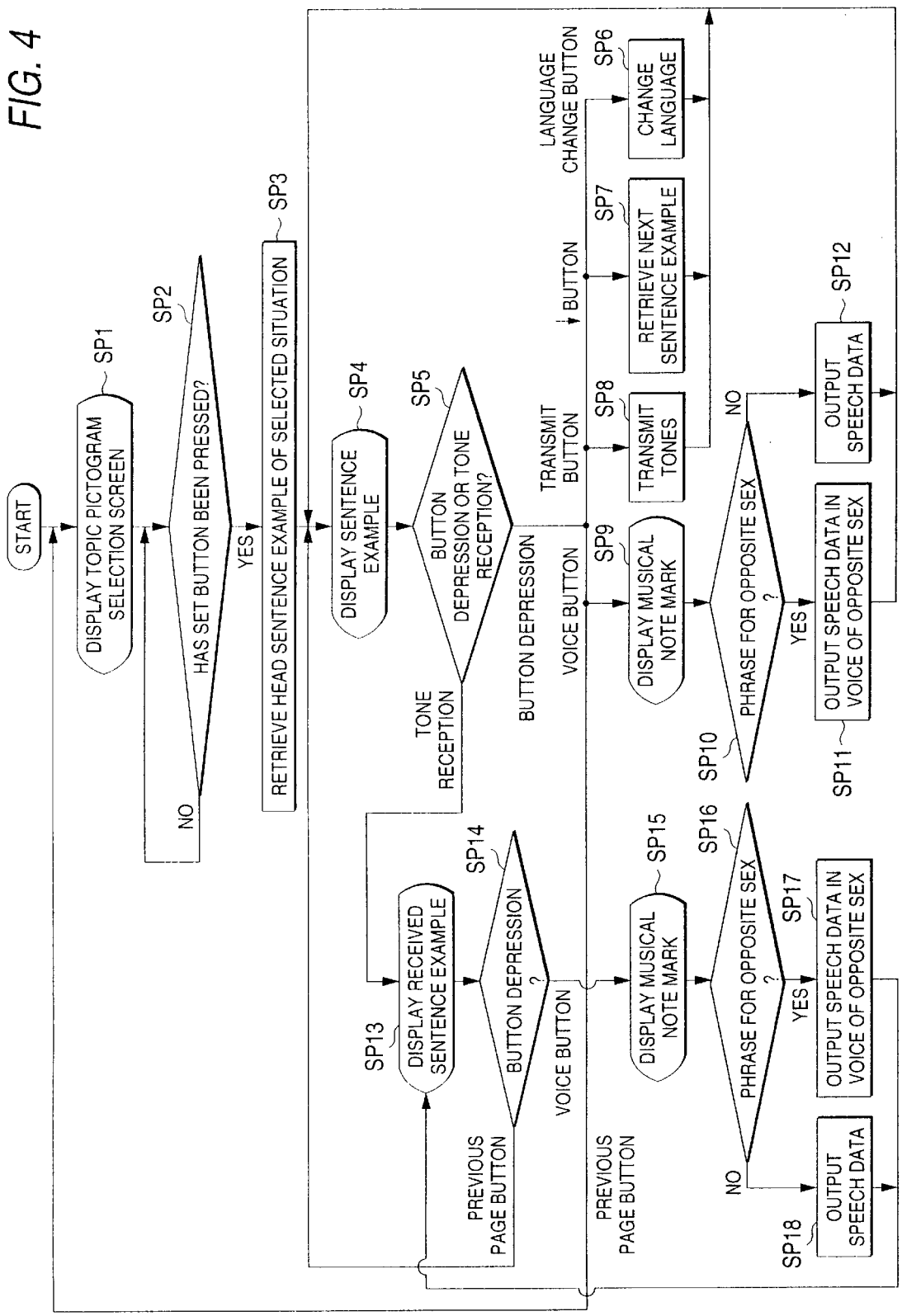
FIG. 4 is a flowchart explaining a first-mode operation.
Figure 5:
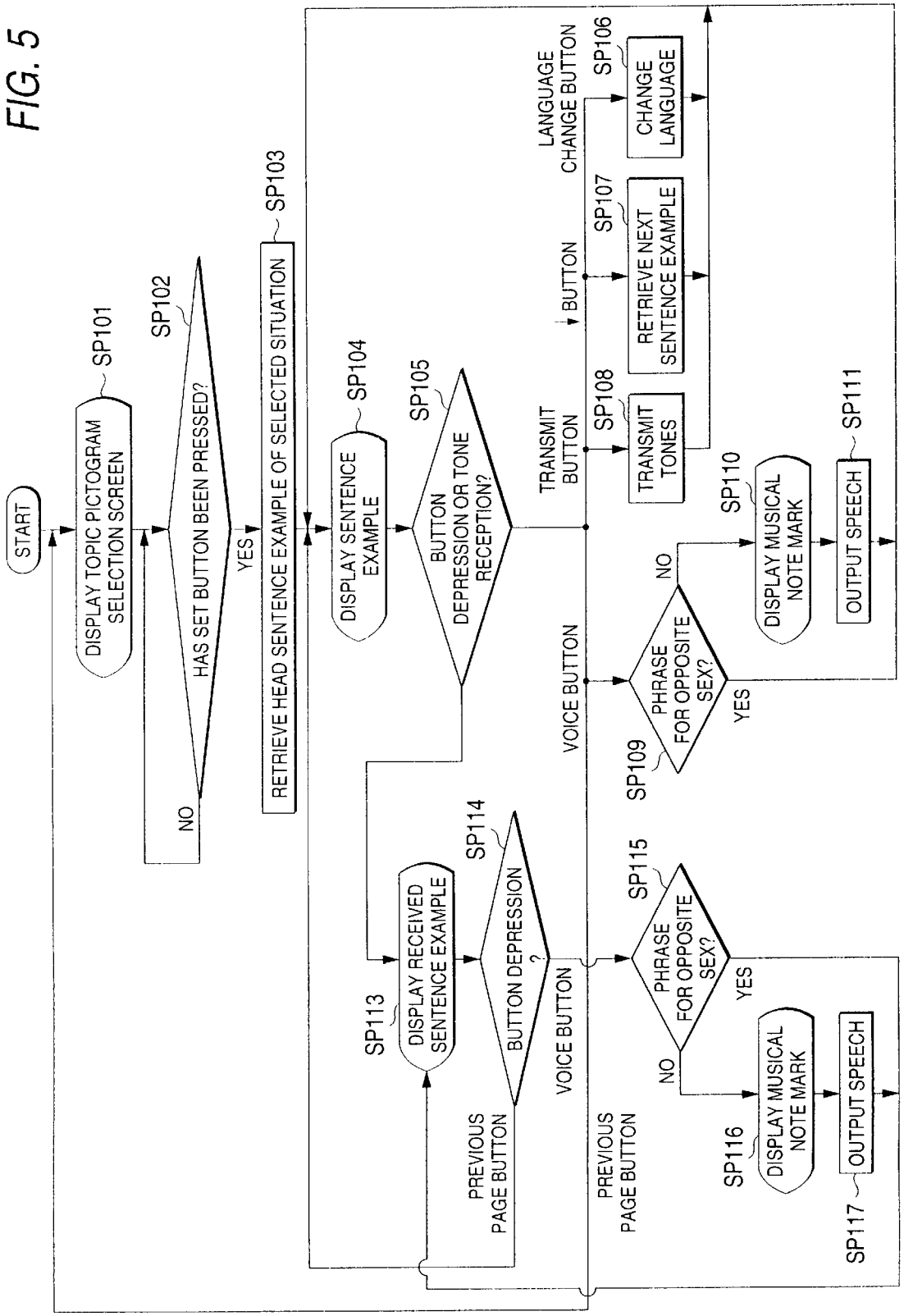
FIG. 5 is a flowchart explaining a second-mode operation.
Figure 6:
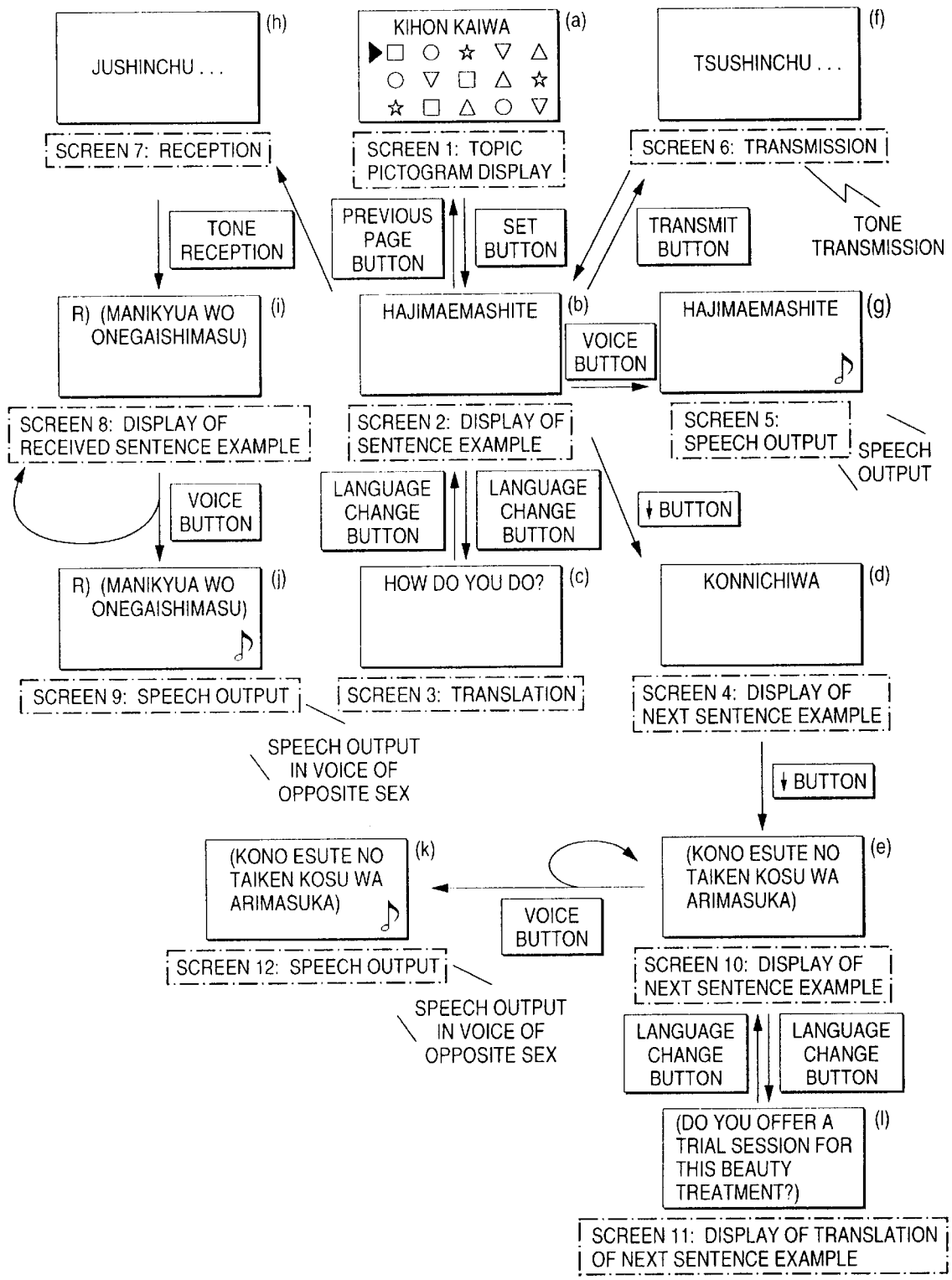
FIG. 6 is a transition diagram explaining screens that are displayed as the language information processing apparatus operates.

A description will be given of the operation of the language information processing apparatus according to the embodiment. FIGS. 4 and 5 are flowcharts explaining the operation of the above-described language information processing apparatus (first and second modes). FIG. 6 is a transition diagram explaining screens that are displayed as the language information processing apparatus operates.

(1) First Mode

In the first mode, as described above, irrespective of whether the language information processing apparatus is for use by a male or a female, speech is outputted based on speech data in a male voice for sentence examples peculiar to males, and based on speech data in a female voice for sentence examples peculiar to females.

When the power of the apparatus is turned on, in Step SP1 shown in FIG. 4, a topic pictogram selection screen is displayed on the display 12 (FIG. 6(a)). The topic pictogram referred to herein is a figure (pictogram) symbolizing a "house," an "automobile," or the like so as to represent a situation where a sentence example is used. In this embodiment, various pictograms are arranged in three rows and five columns, and the name of the selected topic pictogram (a character string such as "Kihon kaiwa," or basic conversation) is displayed above the pictograms. In the initial state of the selection screen, the cursor is located at the topic pictogram at the upper left corner. By pressing one of the up/down left/right cursor buttons 13-1, the user can move the cursor to a desired topic pictogram.

Next, in Step SP2, it is judged whether the set button 13-2 has been pressed. If the judgment result is negative, the operation waits until the set button 13-2 is pressed. After moving the cursor to a desired topic pictogram, the user presses the set button 13-2 to confirm its selection. When the set button 13-2 is pressed, the operation proceeds to Step SP3, where a sentence example at the beginning of the selected topic pictogram is retrieved. In Step SP4, the sentence example is displayed on the display 12 (FIG. 6(b)).

Next, in Step SP5, it is judged whether one of the buttons has been pressed or a tone signal has been received. If no button has been pressed and no tone signal has been received, the current display is maintained. If one of the buttons has been pressed or a tone signal has been received, processing which corresponds to the operated button or the reception of the tone signal is executed. Hereafter, a description will be given of processing which is executed in response to operation of each button or reception of a tone signal.

a. Language Change Button

When the language change button 13-3 is pressed, the operation proceeds from Step SP5 to Step SP6 to change the language information. In this embodiment, assuming that Japanese to English translation is being carried out, if a Japanese sentence is currently displayed on the display 12, it is changed to an English sentence. For example, in a case where the Japanese sentence example data is "Hajimemashite," "How do you do?" is read out. Then, the operation returns to Step SP4 to display on the display 12 the readout English sentence example data "How do you do?" (FIG. 6(c)). Then, in Step SP5, the operation waits for button depression or tone signal reception. The following processing will be executed with respect to English sentence examples.

If the language change button 13-3 is pressed when sentence example data for the opposite sex (e.g., "(Kono esute no taiken kosu wa arimasuka)") is displayed on the display 12 (FIG. 6(e)), English sentence example data corresponding to that Japanese sentence example data is displayed on the display 12 (FIG. 6(l)).

b. Down Cursor Button

When the down cursor button 13-1 (the lower one of the up/down left/right cursor buttons) is pressed, the operation proceeds from Step SP5 to Step SP7. In Step SP7, the ensuing one is selected from the sentence example data shown in FIG. 3. Then, the operation proceeds to Step SP4, where the selected sentence example data (in this case, "Konnichiwa") is displayed on the display 12 (FIG. 6(d)). Then, the operation waits for button depression or tone signal reception in Step SP5. If the down cursor button 13-1 is pressed again, the next sentence example data is displayed on the display 12. In this case, the sentence example "(Kono esute no taiken kosu wa arimasuka)" is displayed (FIG. 6(e)). At this time, since the sentence example data is for the opposite sex, it is displayed in parentheses, as described above. Accordingly, the user can easily recognize that the sentence example data currently displayed is one for the opposite sex.

c. Transmit Button

When the transmit button 13-6 is pressed, the operation proceeds from Step SP5 to Step SP8. In Step SP8, a screen indicating that a tone signal is being transmitted is displayed (FIG. 6(f)), and a tone signal corresponding to the sentence example data currently displayed on the display 12 is transmitted. Specifically, a code is generated by calculation from an address number that corresponds to the sentence example data, and is converted into pushtones by the DTMF generator 27. The pushtones are supplied to the earphone jack of an unillustrated telephone via the earphone jack 29, and are transmitted to the language information processing apparatus of the other party by making use of the calling function of the telephone. After the transmission, the operation returns to Step SP4 to display the former screen. Then, in Step SP5, the operation waits for button depression or tone signal reception.

d. Previous Page Button

When the previous page button 13-5 is pressed, the operation returns from Step SP5 to Step SP1 to display the topic pictogram selection screen (FIG. 6(b)–FIG. 6(a)), to allow the user to select sentence example data of a new topic in the aforementioned Steps SP2 to SP4. Subsequently, in Step SP5, the operation waits for button depression or tone signal reception.

e. Voice Button

When the voice button 13-4 is pressed, the operation proceeds from Step SP5 to Step SP9, where a musical note mark is displayed on the display 12 (FIG. 6(g)). Then, in Step SP10, it is judged whether the sentence example data currently displayed on the display 12 is a sentence example for the opposite sex. If it is a sentence example data for the opposite sex, the operation proceeds to Step SP11. In Step SP11, the speech data (in a voice of a person of the opposite sex) corresponding to the sentence example data is read out and outputted in voice form from the speaker 31 (FIG. 6(k)). Meanwhile, if the sentence example data is not one for the opposite sex, the operation proceeds to Step SP12. In Step SP12, the speech data (in a voice of a person of the same sex) corresponding to the sentence example data is read out and outputted in voice form from the speaker 31 (FIG. 6(g)).

f. Tone Signal Reception

When a tone signal is received, the operation proceeds from Step SP5 to Step SP13, where a message "Jushinchu . . . " indicating that a tone signal is being received is displayed on the display 12 (FIG. 6(h)). Upon completion of the reception, the received sentence example data is displayed (FIG. 6(i)). Specifically, pushtones are received from the earphone jack 29 via the unillustrated telephone, and converted into a code by the DTMF receiver 28. The code is supplied to the CPU 21 via the system bus 22. The CPU 21 converts the code into an address number corresponding to the relevant sentence example stored in the ROM 23 with the use of the RAM 33. The sentence example data is read out by using the address number. Here, a symbol "R)" is put at the beginning of the line as indicating that the sentence example is a received one. In the example of FIG. 6, the display reads "R) (Manikyua wo onegaishimasu)," so that the user can recognize that the sentence example data is one for the opposite sex.

Next, in Step SP14, it is judged whether the previous page button 13-5 or the voice button 13-4 has been pressed. If neither of those buttons has been pressed, the current display is maintained. If either one of those buttons is pressed, the processing which corresponds to the operated button is executed. Hereafter, a description will be given of the processing which is executed in response to depression of each button.

g. Previous Page Button

When the previous page button 13-5 is pressed, the operation returns from Step SP14 to Step SP4 to display the sentence example data that was displayed prior to the reception. Subsequently, in Step SP5, the operation waits for button depression or tone signal reception.

h. Voice Button

When the voice button 13-4 is pressed, the operation proceeds from Step SP14 to Step SP15, where a musical note mark is displayed on the display 12 (FIG. 6(j)). In Step SP16, it is judged whether the received sentence example data currently displayed on the display 12 is one for the opposite sex. If it is a sentence example for the opposite sex, the operation proceeds to Step SP17. In Step SP17, the speech data (in a voice of a person of the opposite sex) corresponding to the sentence example data is read out and outputted in voice form from the speaker 31 (FIG. 6(j)). Meanwhile, if the received sentence example data is not one for the opposite sex, the operation proceeds to Step SP18. In Step SP18, the speech data (in a voice of a person of the same sex) corresponding to the sentence example data is read out and outputted in voice form from the speaker 31. Subsequently, in Step SP14, the operation waits for button depression.

(2) Second Mode

In the second mode, in the language information processing apparatus for a male user, sentence examples peculiar to males are displayed on the display 12 and speech data in a male voice is outputted, whereas sentence examples peculiar to females are displayed on the display 12 but are not outputted in voice form. In the language information processing apparatus for females, sentence examples peculiar to males are displayed on the display 12 but are not outputted in voice form, whereas sentence examples peculiar to female users are displayed and speech data in a female voice is outputted. That is, sentence example data for the opposite sex may be displayed on the display 12, but is never outputted in voice form. In the following, the steps having the counterparts in FIG. 4 will be described only briefly.

When the power of the apparatus is turned on, in Step SP101 shown in FIG. 5, the topic pictogram selection screen is displayed on the display 12 (FIG. 6(a)). Next, in Step SP102, it is judged whether the set button 13-2 has been pressed. When the set button 13-2 has been pressed, the operation proceeds to Step SP103, where a sentence example at the beginning of the selected topic pictogram is retrieved. The retrieved topic pictogram is displayed on the display 12 in Step SP104 (FIG. 6(b)).

Next, in Step SP105, it is judged whether one of the buttons has been pressed or a tone signal has been received. If no button has been pressed and no tone signal has been received, the current display is maintained. If one of the buttons is pressed or a tone signal is received, processing which corresponds to the operated button or the tone signal reception is executed. Incidentally, in the following, a description will be given of only the portions which differ from FIG. 4.

When the voice button 13-4 is pressed, the operation proceeds from Step SP105 to Step SP109, where it is judged whether the sentence example data currently displayed on the display 12 is a sentence example for the opposite sex. If it is a sentence example data for the opposite sex, the operation returns to Step SP104 without outputting voice (FIG. 6(e)). After displaying the sentence example data, the operation waits for button depression or tone signal reception. Meanwhile, if the sentence example data is not one for the opposite sex, the operation proceeds to Step SP110 to display a musical note mark on the display 12 (FIG. 6(g)). Then, in Step SP111, the speech data (in a voice of a person of the same sex) corresponding to the sentence example data is read out and is outputted in voice form from the speaker 31 (FIG. 6(g)).

When a tone signal is received and the voice button 13-4 is pressed, the operation proceeds from Step SP105 to Step SP115 via Steps SP113 and SP114. In Step SP115, it is judged whether the received sentence example data currently displayed on the display 12 is a sentence example for the opposite sex. If it is a sentence example for the opposite sex, the operation returns to Step SP114 without producing a voice output (FIG. 6(i)). In step SP114, the operation waits for button depression.

On the other hand, if the received sentence example data is not a sentence example for the opposite sex, the operation proceeds to Step SP116 to display a musical note mark on the display 12. Then, in Step SP117, the speech data (in a voice of a person of the same sex) corresponding to the received sentence example data is read out and outputted in voice form from the speaker 31.

E. Modifications

By making use of the fact that language information processing apparatus has different speech data (for a male user and a female user) depending on the sex of the user, a flag or the like may be used to manage the information of whether the apparatus is being used by a male user or a female user, and in exchanging data with another language information processing apparatus at a remote place, the flag may be transmitted together with a code indicating sentence example data. If such an arrangement is adopted, the apparatus on the receiving side is able to automatically distinguish the sex of the other party, so that sentence example data corresponding to the received code can be outputted in voice form with appropriate speech data.

Although in the above embodiment the fact that the sentence example is for the opposite sex is represented by marking it with parentheses, the present invention is not limited to such a case. For instance, the sentence example may be displayed in a different color or marked with another symbol. Although in the above embodiment the fact that the sentence example is a received sentence example is represented by marking it with the symbol "R)," the present invention is not limited to such a case. For instance, as in the above modification, the sentence example may be displayed in a different color or marked with another symbol.

Further, although the above-described embodiment is directed to the case where the difference in the type of sentence example is the difference in sex, the invention is not limited to such a case. For example, the language information processing apparatus of the invention is also applicable to a case where the difference in the type of sentence example is the difference in age, such as the elderly and children. In such a case, the invention enables an appropriate communication between persons of different age strata. Further, the language information processing apparatus of the invention is also applicable to a case where commonly used expressions differ among districts, as in the case of the dialects spoken in the Tokyo district and in the Osaka district in Japan. In such a case as well, the invention enables a more appropriate communication between persons located in different districts.

What is claimed is:

1. A language information processing apparatus comprising:

sentence example storing means for storing a plurality of sentence examples;

speech storing means for storing, in at least one of a male and a female voice, speech data corresponding to the sentence examples stored in the sentence example storing means;

input means for receiving an input from a user;

recognizing means for recognizing a sex of the user based on the user's input;

display means for displaying one of the sentence examples stored in the sentence example storing means; and speech outputting means for reading out speech data corresponding to the displayed sentence example from the speech storing means and for outputting the readout speech data in voice form, if the displayed sentence example is a sentence example for the recognized sex of the user.

2. The language information processing apparatus according to claim 1, wherein the speech storing means stores speech data corresponding to sentence examples other than those for the opposite sex.

3. The language information processing apparatus according to claim 1, wherein the display means displays the sentence examples for the opposite sex which are not outputted in voice form from the speech outputting means so as to be distinguished from the other sentence examples.

4. The language information processing apparatus according to claim 3, wherein the display means distinguishes the sentence examples for the opposite sex from the other sentence examples by marking the sentence examples for the opposite sex with a specific symbol.

5. The language information processing apparatus according to claim 1, further comprising:

input means for receiving a code signal corresponding to a sentence example; and converting means for converting the received code signal into a sentence example, wherein the display means displays the converted sentence example.

6. The language information processing apparatus according to claim 5, wherein the code signal is a signal that is transmitted from a remote place via at least one of a wired and a wireless communication line.

7. The language information processing apparatus according to claim 6, wherein the signal transmitted from the remote place is a dual tone multifrequency signal.

8. A language information processing apparatus comprising:

sentence example storing means for storing a plurality of sentence examples;

speech storing means for storing, at least in a voice of a person of the opposite sex of a user of the language information processing apparatus, speech data corresponding to sentence examples for a sex opposite to that of the user among the sentence examples stored in the sentence example storing means;

input means for receiving an input from the user;

recognizing means for recognizing a sex of the user based on the user's input;

display means for displaying one of the sentence examples stored in the sentence example storing means; and speech outputting means for reading out speech data corresponding to the displayed sentence example from the speech storing means based on the recognized sex of the user, and for outputting the readout speech data in voice form.

9. A language information processing apparatus comprising:

sentence example storing means for storing a plurality of sentence examples;

speech storing means for storing speech data corresponding to each of the sentence examples stored in the sentence example storing means in at least one of a male and a female voice depending on a sex of persons who use the sentence example;

input means for receiving an input from a user;

recognizing means for recognizing a sex of the user based on the user's input;

display means for displaying one of the sentence examples stored in the sentence example storing means; and speech outputting means for reading out speech data corresponding to the displayed sentence example from the speech storing means based on the recognized sex of the user, and for outputting the readout speech data in voice form.

10. A language information processing apparatus for exchanging information with a party at a remote place via a wired or wireless communication line, comprising:

sentence example storing means for storing a plurality of sentence examples;

speech storing means for storing, in at least one of a male and a female voice, speech data corresponding to the sentence examples stored in the sentence example storing means;

sex recognizing means for recognizing a sex of the party at the remote place;

input means for receiving a code signal corresponding to a sentence example from the party at the remote place;

display means for displaying the sentence example corresponding to the received code signal; and speech outputting means for selecting speech data corresponding to the displayed sentence example in a voice of a person of a particular sex based on the recognized sex of the party at the remote place, and for outputting the selected speech data in voice form.

11. The language information processing apparatus according to claim 10, wherein the sex recognizing means recognizes the sex of the party at the remote place based on flag data indicating the sex which is transmitted from the party at the remote place.

12. A language information processing apparatus comprising:

a sentence example database including sentence examples in at least a first dialect and a second dialect;

a speech database including speech data corresponding to the sentence examples in the sentence example database;

an input device that receives an input from a user;

a speech recognizer that recognizes a dialect of the user based on the user's input;

a display capable of displaying one of the sentence examples in the sentence example database; and a speaker that outputs a displayed sentence example in voice form if the displayed sentence example is not in a dialect of a user of the language information processing apparatus.

13. A language information processing apparatus comprising:

a sentence example database including sentence examples in at least a first dialect and a second dialect;

a speech database including speech data corresponding to the sentence examples in the first dialect in the sentence example database, the second dialect being the dialect of a user of the language information processing apparatus;

an input device that receives an input from a user;

a speech recognizer that recognizes a dialect of the user based on the user's input;

a display capable of displaying one of the sentence examples in the sentence example database; and a speaker that outputs a displayed sentence example based on the recognized dialect of the user in voice form.

14. A language information processing apparatus comprising:

a sentence example database including sentence examples in at least a first dialect and a second dialect;

a speech database including speech data
in a first voice in the first dialect for the sentence examples in the first dialect in the sentence example database; and
in a second voice in the second dialect for the sentence examples in the second dialect;

an input device that receives an input from a user;

a speech recognizer that recognizes a dialect of the user based on the user's input;

a display capable of displaying one of the sentence examples in the sentence example database; and a speaker that outputs a displayed sentence example based on the recognized dialect of the user in voice form.

15. A language information processing apparatus for exchanging information with a party at a place that is remote from a user of the language information processing apparatus via at least one of a wired and a wireless communication line, the apparatus comprising:

a sentence example database including sentence examples in at least a first dialect and a second dialect;

a speech database including speech data corresponding to the sentence examples in the sentence example database;

a processor for determining the dialect of the party at the remote place;

an input device in communication with the party at the remote place and capable of receiving a code from the party at the remote place, the code corresponding to one of the sentence examples in the sentence example database;

a display that is responsive to the receipt of a code by the input device to display a sentence example that corresponds to the received code; and a speaker that is responsive to the display of a sentence example to output the displayed sentence example in voice form using the corresponding speech data and based upon the recognized dialect of the party at the remote place.

* * * * *